Aug. 10, 1965    R. S. JENKINS    3,200,196
RADAR BRIGHT DISPLAY SYSTEM
Filed May 10, 1962    2 Sheets-Sheet 2

INVENTOR.
Richard S. Jenkins
BY
James T. Barr
ATTY.

United States Patent Office 3,200,196
Patented Aug. 10, 1965

3,200,196
RADAR BRIGHT DISPLAY SYSTEM
Richard S. Jenkins, Addison, Ill., assignor to Admiral Corporation, Chicago, Ill., a corporation of Delaware
Filed May 10, 1962, Ser. No. 193,743
11 Claims. (Cl. 178—6.8)

This invention relates in general to radar bright display control systems, and in particular to television scanning systems applicable for use in, for example, radar bright display control systems.

More particularly, this invention relates to a television scanning system wherein provisions are incorporated for providing a two to one expansion of the video information displayed on the face of a cathode ray tube and for providing off centering of the expanded video information any place within the periphery of the face of the cathode ray tube.

Radar has been used for yielding a visual indication of the position of objects, both stationary and moving, for a number of years. The visual indication is produced on the viewing screen of a cathode ray tube having high persistence phosphors.

In general, a conventional radar display system comprises a directional antenna which transmits short bursts of radio frequency energy. This energy, upon striking an object, is reflected and a portion of the reflected energy is received by the antenna. Knowing the transmission velocity of radio frequency energy, it is possible to determine the distance between the antenna and the object or target based upon the total transit time of the energy burst. Further, a visual indication of the target's position may be realized by employing suitable circuitry.

Radar is most often used for surveying the air space around airports, military installations, etc. For full azimuth surveillance of the air space, the radar antenna is rotated in a fixed plane at a constant angular velocity. It is thus feasible to present a two dimensional display of the area covered by the rotating antenna on a cathode ray tube which is driven by an angular sweep system. Further, by the use of high persistency phosphors a substantially stationary visual indication of the objects detected may be shown on the cathode ray tube screen.

As is well known, the maximum desired range of the radar installation determines the maximum radar pulse repetition frequency. In other words, a sufficient time must elaspe between transmission of successive radar pulses to allow reception of return signals from any objects within the radar's range. If this criterion were not met, it would be difficult to determine which return pulse was in response to any particular transmitted pulse. Target indications on the screen are generally reinforced at a low rate and are characterized by bright spots which fade in intensity as the cathode ray tube beam scans the remaining parts of the tube screen. Even at best (with a short range radar having a high pulse repetition frequency and good phosphors) it is difficult to achieve sufficient brightness to directly view the cathode ray tube screen under ambient light conditions. Consequently, for the usual type of radar installation, the display tube must be viewed in a darkened room.

Radar bright display systems obviate this disadvantage. The advantages of being able to view the radar patterns under ambient light conditions is self-evident, especially where the installation is used as part of an integrated air traffic control system. In essence, a radar bright display system includes everything recited above plus a small television station which effectively "takes a picture" of the radar display pattern for presentation upon a conventional television cathode ray tube. Such a system would, of course, inherently have the same deficiences as the radar system alone since the visual radar display would still tend to fade and this would be recorded by the television camera.

This problem is solved by utilizing a scan conversion storage tube which in essence is a radar display tube and a television camera tube joined together through the medium of a charge storage layer. The tube obviously has no visual properties. On the radar or writing side of the tube, the beam excites the storage layer resulting in an electric characterization of the radar image being put on the storage layer. On the television or reading side of the tube, the beam (over many scans) erases the charges and in the process the electric characterization is picked off the storage layer. With the scan conversion storage tube, the "image" has an extremely high persistency and very bright displays may be achieved by the television apparatus. Thus, with the scan converter tube it is feasible to convert from the angular sweep system necessary for radar display to a rectangular sweep system utilized in television systems. The advantage of the television sweep system is of course obvious since there are thirty complete pictures placed on the television cathode ray tube each second. As a result the picture does not appreciably fade away between scans and a very bright image is obtained.

Since radar is most often used for surveying the air space around airports, military installations, etc. it is particularly desirable, for example, to divide the air space into different sectors and to assign each of these sectors to an operator who is responsible for the particular sector assigned. While there are numerous radar bright display systems disclosed in the prior art, these systems do not contain any provisions for allowing an operator to expand the video information display or survey only a particular area or sector while it is expanded.

It is therefore the principal object of this invention to provide a television scanning system wherein there is incorporated provisions for providing a two to one expansion of the video information displayed on a video display tube.

It is a further object of this invention to provide a television scanning system of the type described above wherein there is also incorporated provisions for off centering the expanded video information anywhere within the periphery of the face of the video display tube.

It is a further object of this invention to provide a radar bright display system wherein provisions are incorporated for providing a two to one expansion of the video information displayed on a video display tube and also provisions for off centering the expanded video information anywhere within the periphery of the face of the video display tube.

Other objects of this invention and the operation thereof will be readily apparent from a reading of the following specification taken in conjunction with the following drawings, in which.

Figure 1:
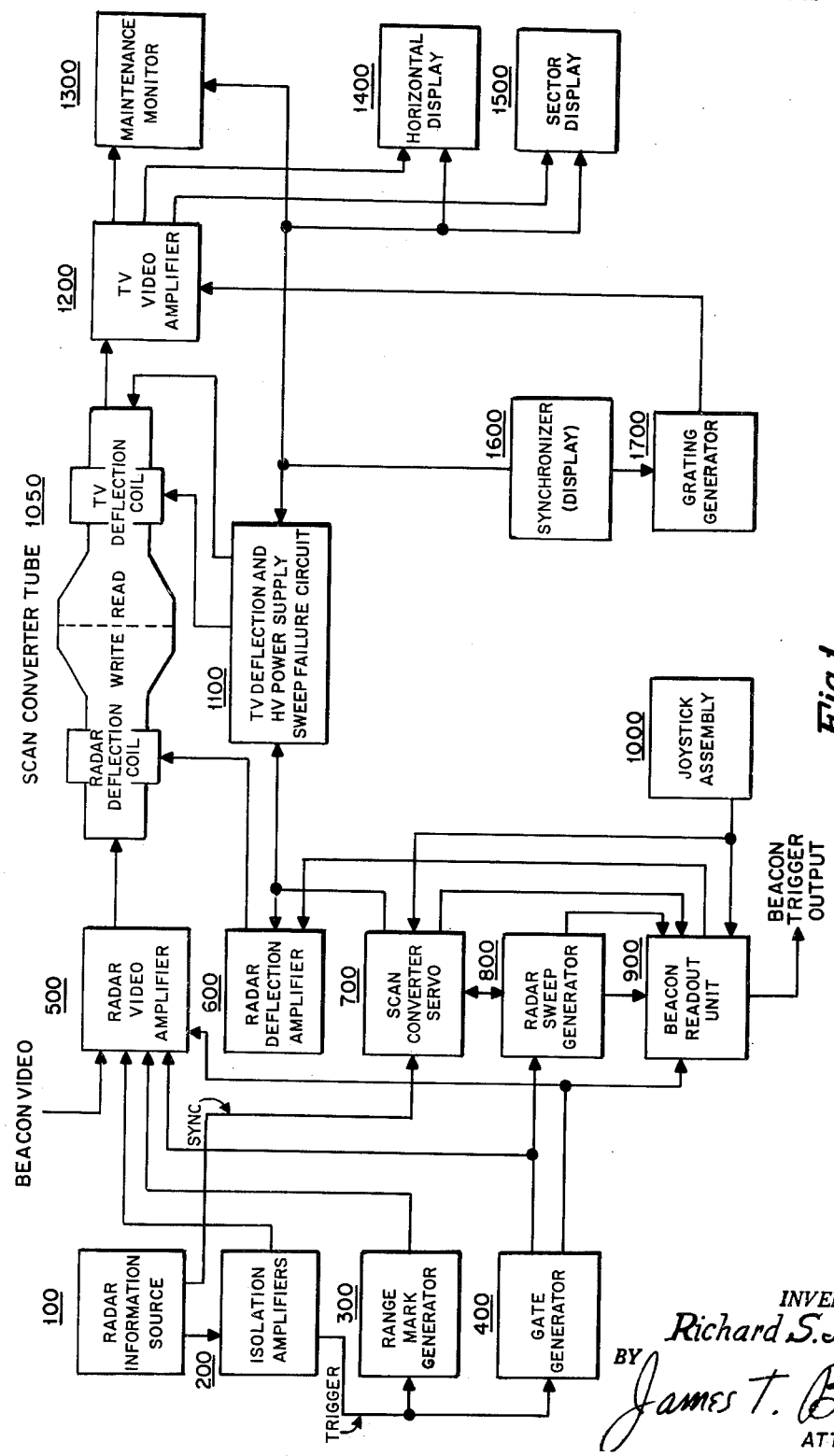
FIG. 1 is a block diagram of a radar bright display system in accordance with this invention.

Referring now to FIG. 1 there is shown a simplified block diagram of a radar bright display system. I should be understood that the lines interconnecting these blocks may actually represent many connections, and that this method of presentation is utilized for clarity in describing the overall operational functions.

Radar information source 100 comprises a source of normal radar video information, such as that from the radar antenna installation, locally generated map information, moving target information (MTI), a radar trigger or pre-trigger pulse and synchronizing information, hereafter referred to as sync, which is utilized to correlate the radial scanning on the writing side of storage tube 1050 with the angular rotation of the radar antenna.

All of the radar information except the sync portion is coupled to isolation amplifiers 200 which individually amplify any of the received information enumerated above and couple it to corresponding inputs in radar video amplifier 500. The sync portion of the radar signal is coupled to the scan converter servo 700.

The amplifier in isolation amplifiers 200 responsible for translating the trigger or pre-trigger pulse has its output coupled to range mark generator 300 and gate generator 400. If a pre-trigger pulse is utilized, suitable delay networks must be incorporated in these generators. If a trigger pulse is utilized, obviously no such delay networks are required. The purpose of the trigger pulse is to simultaneously initiate operation of the radar electronic equipment. The range mark generator includes circuitry for developing the requisite video signals for producing concentric range rings on the display tube, which rings correspond to prescribed distances from the antenna. On the display tube, the center represents the antenna and the radius the maximum radar range. The concentric range rings may be spaced any desired number of "miles apart." The output of range mark generator 300 is coupled to radar video amplifier 500.

Gate generator 400 is responsible for generating voltages for starting the radar sweep generator 800 and for time sharing the radar video amplifier 500 between certain of the video inputs. It also generates a beacon gate pulse which activates the beacon circuit which will be more fully described hereinafter. The radar sweep circuit 800, in conjunction with scan converter servo 700 develops the necessary voltages, which when applied to the writing side deflection coils of the scan converter tube, result in an angular sweep of the input beam.

During the return time of the writing beam, sometimes called the radar dead time, provision is made to place the writing beam under control of beacon readout unit 900. At this point suffice it to say that the radar sweep is time shared with the beacon sweep. To this end radar sweep generator 800 is coupled to beacon readout unit 900, which in turn is coupled to radar deflection amplifier 600 where the composite sweep signal is amplified and fed to the deflection coils on the writing side of scan converter tube 1050.

Joystick assembly 1000 is a mechanical arrangement located on the horizontal display console. By movement of the Joystick the operator can control the position of a beacon marker and physically place it over a radar target indication on the horizontal display console. Joystick assembly 1000 is thus shown connected to scan converter servo 700 and beacon readout unit 900. The rectangular coordinates of the position of the beacon marker are converted by the scan converter servo into the angular coordinates corresponding thereto. In effect operation of the Joystick causes a marker to be placed upon the writing storage layer of scan converter tube 1050 and simultaneously generates a beacon trigger output signal which is indicative of the position of the beacon marker.

The beacon trigger output signal is coupled to other equipment (not shown) which is responsible for performing various beacon functions such as identification of the object. Assuming that the object is an airplane, it will carry receiving and transmitting equipment so that when a beacon signal is received, it automatically transmits identifying information. If the proper information is received, the object may be considered to be identified and the beacon equipment will send back to the radar system video amplifier 500 a beacon video signal of some type which is placed upon the scan converter tube storage layer at the point where the identified object appears. Of course, the display tube will then yield a visual indication of the beacon video.

This, in general, summarizes the operation of the radar portion of the radar bright display system. The television portion of the system follows very closely conventional television techniques.

A synchronizer 1600 generates the required horizontal and vertical sync pulses. These pulses are fed to TV deflection circuit 1100, which includes scan failure circuitry to protect scan converter tube 1050 from damage due to faulty functioning of the system. The sweep failure circuitry is disclosed in a copending application of Beitz et al., Serial No. 200,444, filed June 6, 1962 and reference may be had to that application for its complete description. The TV deflection circuit is, in turn, coupled to the reading side of scan converter tube 1050, maintenance monitor 1300 which is a display unit that may be used to monitor the operation of the system, horizontal display console 1400 and sector or vertical display 1500. These latter units are merely display consoles mounted to provide a display on a horizontal viewing plane and a vertical viewing plane, respectively. Additionally, synchronizer 1600 controls a grating generator 1700 which contains circuitry for selectively generating a horizontal line pattern, a vertical line pattern, a cross hatch pattern or a dot pattern for checking the operation of the television portion of the system. The grating generator output is coupled to television video amplifier 1200. It should be noted that television video amplifier 1200 may contain a number of individual amplifiers, as it should be obvious that many television displays may be operated from this bright display system. The reading side of scan converter tube 1050 essentially comprises a television camera in which the picture area is subjected to rectangular rather than radial scan. Synchronizer 1600 coordinates the scan in the reading side of scan converter tube 1050 with the scan in all of the television display apparatus. The various charge patterns developed by the writing beam on the storage layer in tube 1050 are sensed by the writing beam and converted into video information which is amplified by TV video amplifier 1200. This information is then applied to the various television display units to create the total bright display radar presentation.

Figure 2:
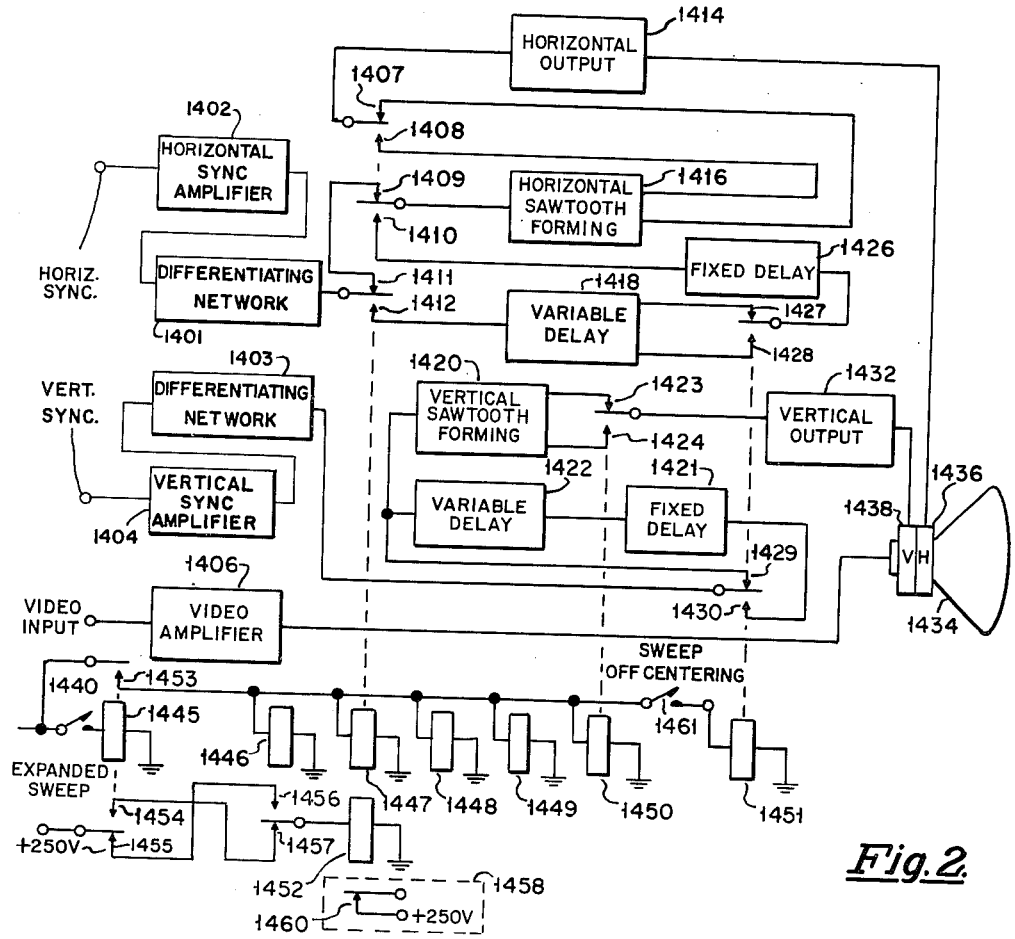
FIG. 2 is a block diagram of a display unit of the radar bright display system shown in FIG. 1 incorporating this invention.

Refer now to FIG. 2 which shows one of the display units, horizontal display 1400, in greater detail, in simplified block diagram. Horizontal display 1400 includes both circuitry for providing a two to one expansion of the horizontal and vertical sweeps and for off centering the video information display anywhere within the periphery of the face of the cathode ray tube. The video output of scan conversion storage tube 1050 is received by video amplifier 1406, amplified and coupled to the cathode ray tube 1434. Horizontal sync pulses from synchronizer 1600 are received and amplified by horizontal sync amplifier 1402, differentiated by differentiating network 1401 and are either used to trigger the horizontal sawtooth forming network 1416 for normal sweep operation, or are delayed and then applied to horizontal sawtooth forming network 1416 for both expanded sweep and off centering operation. The output of horizontal sawtooth forming network 1416 is coupled to horizontal output 1414 which drives horizontal deflection coil 1436 of cathode ray tube 1434.

The vertical sync pulses are received and amplified by vertical sync amplifier 1404 differentiated by differentiating network 1403 and used to trigger vertical sawtooth forming network 1420 for both the normal and expanded sweep operation or are delayed and then coupled to vertical sawtooth forming network 1420 for the off center, expanded sweep operation. The output of vertical sawtooth forming network 1420 is coupled to vertical output 1432 which drives vertical deflection coil 1438 of cathode ray tube 1434.

Blanking circuits (not shown) included in horizontal output 1414 blank the cathode ray tube 1434 during both horizontal and vertical retrace time, since the video signal does not contain proper blanking pulses for display use. Also, wider blanking pulses are provided for expanded sweep operation.

A dynamic focus circuit (not shown) is also included in horizontal output 1414 to correct the defocusing of the electron beam of cathode ray tube 1434 as it sweeps from the center to the edge of the cathode ray tube screen. This defocusing occurs because the relatively flat surface of the cathode ray tube face is actually tangent to the arc of the circle through which the electron beam is deflected.

More specifically, during normal sweep operation the video output from television video amplifier 1200, as previously stated, is coupled to the input of video amplifier 1406 of horizontal display 1400. The video signal is amplified and coupled to cathode ray tube 1434. The horizontal sync pulse from synchronizer 1600 is coupled to the input of horizontal sync amplifier 1402, amplified by horizontal synch amplifier 1402, differentiated by differentiating network 1401 and coupled through break contacts 1411 and 1409 of relay 1447 to the input of horizontal sawtooth forming network 1416. Horizontal sawtooth forming network 1416, generates a sawtooth waveform which is coupled through break contact 1407 of relay 1447 to the input of horizontal output 1414. Horizontal output 1414 amplifies the sawtooth waveform and couples it to horizontal deflection coil 1436 of cathode ray tube 1434.

The vertical synch pulse from synchronizer 1600 is coupled to the input of vertical sync amplifier 1404 of horizontal display 1400, amplified by vertical sync amplifier 1404, differentiated by differentiating network 1403 and coupled through break contact 1429 of relay 1451 to the input of vertical sawtooth forming network 1420. Vertical sawtooth forming network 1420 generates a sawtooth waveform which is coupled through break contact 1423 to vertical output 1432. Vertical output 1432 amplifies and couples the sawtooth wave to vertical deflection coil 1438 of cathode ray tube 1434.

In this respect, that is, during normal sweep operation, the operation of the television portion of the radar bright display system is the same as, or may be the same as, the operation of those systems of this type well known in the art. Furthermore, the circuitry of the horizontal and vertical deflection circuits of horizontal display 1600 may be of the standard type well known in the art, with the exception of those details which will be more specifically mentioned in the description which follows.

In accordance with the principal object of this invention to provide a two to one expansion of the video information display and to provide off centering of this display any place within the periphery of the face of the cathode ray tube, delay circuits are provided in both the horizontal and vertical deflection circuits and a group of relays is provided to switch these delay circuits into the horizontal and vertical deflection circuits. Simultaneously with this switching operation, these relays also switch the horizontal and vertical deflection circuits to provide modified sweep waveforms, as will be explained more fully in the material which follows. Upon completion of these two switching operations, the system is prepared for expanded sweep and off centering operation.

Expanded sweep operation is initiated by the operator closing contact 1440 to couple a positive potential through relay 1445 to ground, thereby energizing relay 1445. Relay 1445, in operating, closes make contact 1454 which couples a positive potential through make contact 1454, break contact 1457 of relay 1446 and relay 1452 to ground, causing relay 1452 to operate. Relay 1452 is a fast acting relay which operates to close its contacts in 4 milliseconds maximum and restores them to normal in the same length of time. The function of relay 1452 will be explained in greater detail in the material which follows. Relays 1446–1448 and relay 1450 all have a pull in time of 20 milliseconds minimum while relay 1449 has a pull in time of 6 milliseconds minimum. Relays 1446–1448 and relay 1450 all have a drop out time of 14 milliseconds. Relay 1449 has a drop out time of 6 milliseconds. The purpose of these relays having various pull in and drop out times will also be explained in greater detail in the material which follows. Relay 1445, in operating, also closes make contact 1453 to couple a positive potential to relays 1446–1450 to cause them to operate. After 20 milliseconds, relay 1446 operates to remove the positive potential coupled through break contact 1457 and relay 1452 to ground, and relay 1452 after 4 milliseconds drops out. When relay 1452 restores closing its break contact 1460 switching is completed and the rastor is again present. Thus, the total sequence time to switch from the normal sweep to the expanded sweep is approximately 24 milliseconds, that is, the 20 milliseconds required for relays 1446–1448 and relay 1450 to pull in and the 4 milliseconds required for relay 1452 to drop out.

Upon completion of the above-described switching operation, the output of horizontal sync amplifier 1402 is coupled through make contact 1412 to variable delay network 1418 and its output is coupled through make contact 1427 to the fixed delay network 1426. The output of fixed delay network 1426 is coupled through make contact 1410 of relay 1447 to horizontal sawtooth forming network 1416. The output of horizontal sawtooth forming network 1416 is now coupled through make contact 1408 of relay 1447 to the input of horizontal output 1414. In the vertical deflection circuitry, the output from vertical sync amplifier 1404 is coupled through break contact 1429 of relay 1451 to the input of vertical sawtooth forming network 1420, in the same manner as during normal sweep operation, and its output is coupled through make contact 1424 of relay 1450 to the input of vertical output 1432. The output of vertical output 1432 is coupled to vertical deflection coil 1438 of cathode ray tube 1434.

Also, as previously stated, simultaneously with this switching operation, the deflection circuitry included in horizontal sawtooth forming network 1416 and horizontal output 1414 is switched by means of contacts (not shown) on relays 1446–1450 to now provide a horizontal sweep waveform which approximates a sine wave and which reaches full sweep amplitude in one-half the time required for the normal sweep waveform to reach that amplitude. This is accomplished by redesigning the same sweep circuitry to provide such a sweep waveform, in a manner well-known in the art, and by then switching the sweep circuitry to provide one or the other of the two sweep waveforms. The deflection circuitry included in vertical sawtooth forming network 1420 and vertical output 1432 is switched in a like manner by means of contacts (not shown) of relays 1446–1450. In this case, however, the sweep circuitry is redesigned to provide a sweep waveform which has twice the amplitude as that of the normal sweep waveform and the sweep circuitry is switched to provide one or the other of the two sweep waveforms. This is likewise accomplished in a manner well-known in the art.

When the system is switched to expanded sweep operation a two to one expansion of the horizontal sweep is obtained, since the output sweep waveform of the horizontal sawtooth forming networks 1416 and horizontal output 1414 now reach the full sweep amplitude in one half the time required for the normal sweep waveform to reach that amplitude. Also, the horizontal sync pulse is delayed approximately 42 microseconds to position the center of the video information in the center of the face of the cathode ray tube 1434. This fixed delay of approximately 42 microseconds compensates for the horizontal shift in the center of the video information which occurs due to the fact that the electron beam is now deflected across the face of cathode ray tube 1434 in one half the time normally required and only that portion of the video information which the electron beam would normally scan during the first half of its normal sweep is now displayed over the entire face of cathode ray tube 1434. The horizontal sync pulse could be delayed only 7 microseconds to accomplish this same result, but introducing delay in this manner is unsatisfactory to provide an uninterrupted display of the entire video information, as will be explained.

As it is well known by those skilled in the art, scanning in a television system normally takes place from center to right and then from left to center. During the retrace time, as the electron beam is moved from right to left the video information display is normally blanked out by means of blanking pulses in order to prevent the fly back of the electron beam from being observed on the cathode ray tube. These blanking pulses normally occur in synchronism with the horizontal and vertical sync pulses. The blanking pulses, therefore, occur at the end of each line, or approximately every 35 microseconds. Inasmuch as the horizontal sweep is triggered by the horizontal sync pulse and the sync pulse is 7 microseconds in duration, the horizontal sweep is not triggered until after a delay of 17 microseconds if the horizontal sync pulse is initially delayed approximately 7 microseconds. The total delay in triggering the horizontal sweep therefore varies from 14 to 35 microseconds since an additional delay of 21 microseconds, or a total of 28 microseconds, is required to view the entire video information display. A blanking pulse would therefore appear on the left side of the face of the cathode ray tube, interrupting the video display since, as stated above, the blanking pulses occur approximately every 35 microseconds.

In accordance with this invention, the horizontal sync pulse is initially delayed 42 microseconds. The horizontal sweep therefore is triggered after 49 microseconds and the center of the video information is positioned in the center of the face of cathode ray tube 1434, as it is during normal sweep operation. It is not practical to design a variable delay network for varying the delay from approximately zero microseconds to 28 microseconds, the total value of variable delay which is required to view the entire video display, hence variable delay network 1418 is designed to provide a fixed delay of 20 microseconds when the system is switched to expanded sweep operation. The fixed delay of variable delay network 1418 is taken into consideration with the 22 microseconds fixed delay of fixed delay network 1426 to provide the initial 42 microsecond delay. With the system switched to expanded sweep operation, an operator may now shift to off centering operation, and after doing so, the center of the video information may be shifted to any position within the periphery of the face of cathode ray tube 1434. Off centering operation is initiated by closing contact 1461 to cause relay 1451 to operate. This is as follows: a positive potential is extended through make contact 1453 of relay 1445, contact 1461 (now operated) and relay 1451 to ground. Relay 1451, in operating, closes its contacts 1428 and 1430. The output of vertical sync amplifier 1404 is now coupled through make contact 1430, fixed delay network 1421 and variable delay network 1422 to the input of vertical sawtooth forming network 1420. At make contact 1428 of relay 1451, the output of variable delay network 1518 is switched, for reasons to be explained.

It may be recalled that when the system is switched to expanded sweep operation the center of the video information is horizontally shifted to the right side of the face of cathode ray tube and that to compensate for this shift the horizontal sync pulse is delayed approximately 42 microseconds. This delay, as it has been explained, is provided, in part, by means of variable delay network 1418. When the system is switched to expanded sweep, off centering operation the value of fixed delay introduced by variable delay network 1418 is decreased to 13 microseconds. This is indicated in FIG. 2 by showing variable delay network 1418 having two outputs, one of which provides a fixed delay of 20 microseconds and which is extended to the input of fixed delay network 1426 by way of break contact 1427 of relay 1451. The other output provides a variable delay of 13–27 microseconds and is extended to the input of fixed delay network 1426 by way of make contact 1428 of relay 1451. Therefore, when the system is switched to expanded sweep, off centering operation the output of variable delay network 1418 is switched and the horizontal sync pulse is delayable from a minimum of 35 microseconds to a maximum of 49 microseconds (the total being the sum of 22 microseconds delay provided by fixed delay network 1426 plus the amount of delay introduced by variable delay network 1418).

Assuming that variable delay network 1418 is set so as to provide the minimum delay, 13 microseconds, the center of the video information display would be shifted to the right side of the face of cathode ray tube 1434. Increasing the delay of variable delay network 1418 from 13 microseconds to 27 microseconds then progressively shifts the center of the video information display from the right side to the left side of cathode ray tube 1434, without being interrupted by a blanking pulse.

Referring now to the vertical deflection circuits, the operation, as previously stated, differs from the operation of the horizontal deflection circuits. It may be recalled that when switching to expanded sweep operation the output of vertical sync amplifier 1404 is coupled to vertical sawtooth forming network 1420 in the same manner as during normal sweep operation. It may also be recalled that when the system is switched to expanded sweep operation the only changes which occurs in the vertical deflection circuits is that the deflection circuitry included in vertical sawtooth forming network 1420 and vertical output 1432 is switched so as to provide a sweep waveform which has double the amplitude of the normal sweep amplitude. In this case the vertical sawtooth waveform merely causes the electron beam to overscan and only that portion of the sweep waveform which corresponds in amplitude to that of the normal sweep waveform appears on the face of cathode ray tube 1434. The video information display therefore is expanded, but the center of the video information with respect to vertical displacement remains in the center of the cathode ray tube 1434.

When the system is switched to expanded sweep, off centering operation, the vertical sync pulse, like the horizontal sync pulse, must be delayed to avoid having the video information display interrupted by the blanking pulses. A predetermined fixed delay of 12,000 microseconds is therefore introduced by means of fixed delay 1421 and variable delay network 1422 to vertically shift the center of the video information to the bottom of cathode ray tube 1434. Variable delay 1422 like variable delay 1418 has a fixed delay, in this case 4,000 microseconds, and is variable to introduce from 4,000 microseconds to 12,000 microseconds delay. Fixed delay network 1421 has a fixed delay of 8,000 microseconds. When the system is switched to expanded sweep, off centering operation, the center of the video information may be progressively shifted from the bottom to the top of cathode ray tube 1436, uninterrupted by the blanking pulses, by varying the value of delay introduced by variable delay network 1422.

It may therefore be noted that when off centering switch 1461 is closed to cause relay 1451 to operate, the center of the expanded video information may be centered any place within the periphery of the cathode ray tube 1434 by varying the amount of delay introduced in both the horizontal and vertical deflection circuits by means of variable delay networks 1418 and 1422, respectively.

When switching from the expanded sweep operation to normal sweep operation the operator opens contact 1440 which removes the positive potential holding relays 1445–1451 operated. It may be recalled that all of the relays with the exception of relays 1449 and 1452 have a drop out time of 14 milliseconds and that relays 1449 and 1452 have a drop out time of 6 milliseconds and 4 milliseconds, respectively. Therefore, the total time required to switch from expanded sweep operation to normal sweep operation is 18 milliseconds, that is, the 14 milliseconds required for relay 1445 and relays 1447–1451 to drop out and the 4 milliseconds for relay 1452 to drop out. It may also be noted that prior to the time relay 1446 drops out a positive potential is extended through break contact 1455 of relay 1445 and make contact 1456 of relay 1446 to relay 1452 and ground. This positive potential causes relay 1452 to operate to open its contact 1460, the function of which will be explained in the material which follows.

Figure 3:
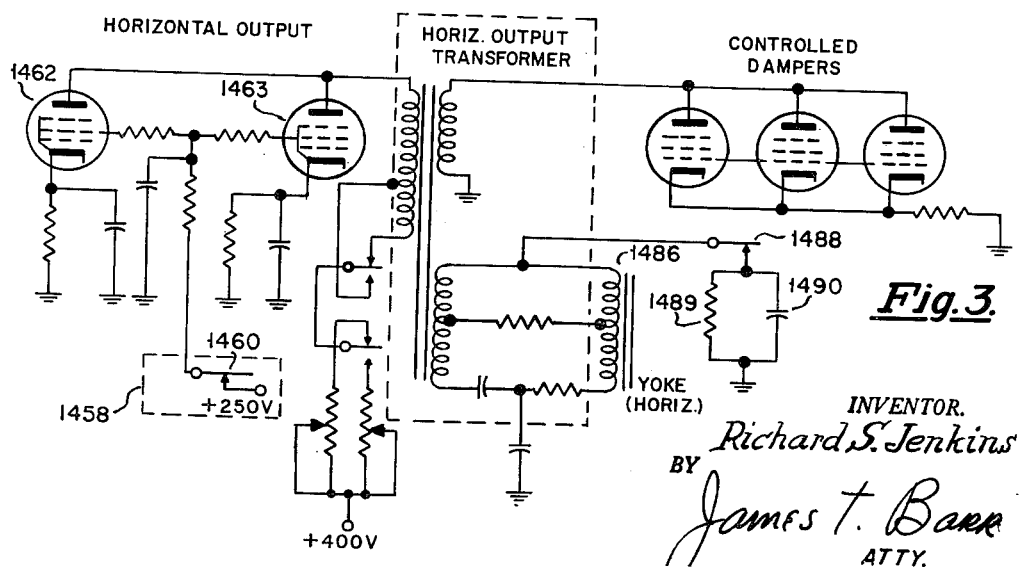
FIG. 3 is a partial schematic diagram of a horizontal output circuit in accordance with this invention.

Referring now to FIG. 3 a portion of horizontal output circuit 1414 is shown in a schematic diagram. The most difficult requirement in switching from normal sweep to expanded sweep operation with a minimum interruption of the video display is that of switching the shunt resistor 1489 and capacitor 1490 in and out of the horizontal yoke coil 1486 since pulses on the order of 2000 volt peaks are present under normal sweep operation. The horizontal sweep must, therefore, be collapsed during the switching operation. This was accomplished by removing screen voltage from the horizontal output tubes 1462 aind 1463 before, during and after the switching of the yoke components and the other components which vary the circuit parameters in the various units of horizontal display 1400. Relays 1445–1452 also perform this switching operation in the proper sequence. The sequence of operation is as follows. Contact 1440 is closed extending positive potential through relay 1445 to ground, thereby causing relay 1445 to operate. Relay 1445, in operating, causes make contact 1454 to extend the positive potential through make contact 1454 of relay 1445, break contact 1457 of relay 1446, and relay 1452 to ground to cause relay 1452 to operate. As it was previously stated, the pull in time for relay 1446 is approximately 20 milliseconds whereas the pull in time of relay 1452 is 4 milliseconds. Relay 1452 therefore operates prior to the operation of relay 1446. Contacts 1460 of relay 1452 is shown in the dashed box 1458 and are the same contacts shown in the dashed box 1458 in FIG. 3. It may be noted, therefore, that when relay 1452 operates, make contact 1460 opens and the screen voltage for the horizontal output tubes 1462 and 1463 is removed. With the screen voltage removed from the horizontal output tubes 1462 and 1463 the sweep collapses in approximately one millisecond. When relay 1445 operated, closing its make contact 1453, the positive potential also was extended to relay 1446–1450. These relays, with the exception of relay 1449, pull in after 20 milliseconds, and perform the various switching operations previously set forth. As it was previously stated, relay 1449 has a pull in time of 6 milliseconds and thus contact 1488 shown in FIG. 3 is closed after 6 milliseconds to switch the shunt resistor 1489 and capacitor 1490 in the yoke components after the sweep has collapsed. It may also be noted that switching takes place prior to the time that relay 1452 drops out, since relay 1446 has a pull in time of 20 milliseconds. Relay 1446 when operated after 20 milliseconds removes the positive potential holding relay 1452 operated and after 4 miliseconds relay 1452 drops out. Contacts 1460 close to again apply screen voltage to the horizontal output tubes 1462 and 1463, and the raster is again present.

When switching from expanded sweep to the normal sweep, the operation is as follows. The operator opens contact 1440, removing the positive potential holding relays 1445–1450 operated. These relays, with the exception of relays 1449 and 1452, have a drop out time of 14 milliseconds. Relays 1449 and 1452 have a drop out time of 6 and 4 milliseconds, respectively. Thus, when relay 1445 restores after 14 milliseconds, the positive potential is extended through break contact 1455 of relay 1445, make contact 1456 of relay 1446 (still operated) and relay 1452 to ground to thereby cause relay 1452 to again operate to open its contact 1460. Screen voltage is again removed from the horizontal output tubes 1462 and 1463. Relay 1446 restores after 14 milliseconds to remove the positive potential holding relay 1452 operated and relay 1452 restores after 4 milliseconds. The total elapsed switching time is therefore approximately 18 milliseconds when switching from expanded sweep to normal sweep operation.

The detailed description of the particular embodiment of the invention illustrated and described herein is not to be construed as limiting the invention thereto. It will be readily appreciated by those skilled in the art that certain portions of the invention, for example, the television scanning circuitry, will find application in many other arrangements. The invention includes all features of patentable novelty residing in the foregoing description and the accompanying drawings.

What is claimed is:

1. A radar bright display system comprising: a source of radar information; radar display means for displaying said radar information; means for coupling said source of radar information to said radar display means; television scanning means for scanning said radar display means to provide a television video signal of said radar information; a source of sync pulses; a display tube having an input, a horizontal deflection coil and a vertical deflection coil; means for coupling said television video signal to said input of said display tube; horizontal deflection circuits for providing a first horizontal sweep waveform having a predetermined amplitude and a second horizontal sweep waveform which reaches said predetermined amplitude in one-half the time required for said first horizontal sweep waveform to reach that amplitude; vertical deflection circuits for providing a first vertical sweep waveform having a predetermined amplitude and a second vertical sweep waveform which reaches twice the amplitude of said first vertical sweep waveform in the same period of time; said horizontal and vertical deflection circuits coupled to said horizontal and vertical deflection coils, respectively, and normally coupled to said source of sync pulses; delay means connectable in the coupling between said source of sync pulses and said horizontal deflection circuit; and means operated to connect said delay means in said last mentioned coupling and for switching said horizontal and vertical deflection circuits to provide said second horizontal and vertical sweep waveforms, whereby a two to one expansion of said video information is displayed by said display tube and the center of said expanded video display is positioned in the center of said display tube.

2. A radar bright display system comprising: a source of radar information; radar display means for displaying said radar information; means for coupling said source of radar information to said radar display means; television scanning means for scanning said radar display means to provide a television video signal of said radar information; a source of sync pulses; a display tube having an input, a horizontal deflection coil and a vertical deflection coil; means for coupling said television video signal to said input of said display tube; horizontal deflection circuits for providing a first horizontal sweep waveform having a predetermined amplitude and a second horizontal sweep waveform which reaches said predetermined amplitude in one-half the time required for said first horizontal sweep waveform to reach that amplitude; vertical deflection circuits for providing a first vertical sweep waveform having a predetermined amplitude and a second vertical sweep waveform which reaches twice the amplitude of said first sweep waveform in the same period of time; said horizontal and vertical deflection circuits coupled to said horizontal and vertical deflection coils, respectively, and both normally coupled to said source of sync pulses; first delay means connectable in a first coupling between said source of sync pulses and said horizontal deflection circuit; second delay means connectable in a second coupling between said source of sync pulses and said vertical deflection circuit; first means operated to connect said first delay means in said first coupling and for switching said horizontal and vertical deflection circuits to provide said second horizontal and vertical sweep waveforms; and second means operated to connect said second delay means in said second coupling, whereby a two to one expansion of said video information is displayed by said display tube and the center of said video information is positioned on said display tube in accordance with the delay introduced by said first and second delay means.

3. A radar bright display system comprising: a source of radar information; radar display means for displaying said radar information; means for coupling said source of radar information to said radar display means; television scanning means for scanning said radar display means to provide a television video signal of said radar information; a source of sync pulses; a display tube having an input, a horizontal deflection coil and a vertical deflection coil; means for coupling said television video signal to said input of said display tube; horizontal deflection circuits for providing a first horizontal sweep waveform having a predetermined amplitude and a second horizontal sweep waveform which reaches said predetermined amplitude in one-half the time required for said first horizontal sweep waveform to reach that amplitude; vertical deflection circuits for providing a first vertical sweep waveform having a predetermined amplitude and a second vertical sweep waveform which reaches twice the amplitude of said first vertical sweep waveform in the same period of time; said horizontal and vertical deflection circuits coupled to said horizontal and vertical deflection coils, respectively, and normally coupled to said source of sync pulses; delay means connectable in the coupling between said source of sync pulses and said horizontal deflection circuit; relay means having a plurality of contacts, said plurality of relay contacts being operatively connected to switch said delay means in said last mentioned coupling and to switch said horizontal and vertical deflection circuits to provide said second horizontal and vertical sweep waveforms, whereby a two to one expansion of the video information displayed by said display tube is provided and the center of said expanded video information is positioned in the center of said display tube.

4. A radar bright display system, as claimed in claim 3: further including second delay means connectable in the coupling between said source of sync pulses and said vertical deflection circuits; and wherein said relay means further includes contacts for connecting said second delay means in the coupling between said source of sync pulses and said vertical deflection circuit, whereby the center of said expanded video information is positioned anywhere within the periphery of the face of said display tube in accordance with the delay introduced by means of said first and second delay means.

5. A radar bright display system comprising: a source of radar information; radar display means for displaying said radar information; means for coupling said source of radar information to said radar display means; television scanning means for scanning said radar display means to provide a television video signal of said radar information; a source of sync pulses, a display tube having an input, a horizontal deflection coil and a vertical deflection coil; means for coupling said television video signal to said input of said display tube; horizontal deflection circuits for providing a first horizontal sweep waveform having a predetermined amplitude and a second horizontal sweep waveform which reaches said predetermined amplitude in one-half the time required for said first horizontal sweep waveform to reach that amplitude; vertical deflection circuits for providing a first vertical sweep waveform having a predetermined amplitude and a second vertical sweep waveform which reaches twice the amplitude of said first vertical sweep waveform in the same period of time; said horizontal and vertical deflection circuits coupled to said horizontal and vertical deflection coils, respectively, and normally coupled to said source of sync pulses; a plurality of horizontal output tubes included in said horizontal deflection circuit; a source of potential for providing screen voltage for said plurality of horizontal output tubes; first delay means connectable in a first coupling between said source of sync pulses and said horizontal deflection circuit; second delay means connectable in a second coupling between said source of sync pulses and said vertical deflection circuit; means operated to connect said first and second delay means in said first and said second coupling respectively and for switching said horizontal and vertical deflection circuits to provide said second horizontal and vertical sweep waveforms, whereby a two to one expansion of said video information is provided and the center of said video information is positioned on said display tube in accordance with the delay introduced by means of said first and second delay means; and means for disconnecting said screen voltage from said plurality of horizontal output tube during said switching and for restoring said screen voltage upon the completion of said switching.

6. A radar bright display system comprising: a scan conversion storage tube having a writing section, a reading section and a target section; a source of radar information; means for coupling said source of radar information to said writing section; television scanning means connected to said reading section for providing a television video signal of said radar information coupled to said writing section; a source of sync pulses; a display tube having an input, a horizontal deflection coil and a vertical deflection coil; means for coupling said television video signal to said input of said display tube; horizontal deflection circuits for providing a first horizontal sweep waveform having a predetermined amplitude and a second horizontal sweep waveform which reaches said predetermined amplitude in one-half the time required for said first horizontal sweep waveform to reach that amplitude; vertical deflection circuits for providing a first vertical sweep waveform having a predetermined amplitude and a second vertical sweep waveform which reaches twice the amplitude of said first vertical sweep waveform in the same period of time; said horizontal and vertical deflection circuits coupled to said horizontal and vertical deflection coils, respectively, and normally coupled to said source of sync pulses; delay means connectable in the coupling between said source of sync pulses and said horizontal deflection circuit; and means operated to connect said delay means in said last mentioned coupling and for switching said horizontal and vertical deflection circuits to provide said second horizontal and vertical sweep waveforms, whereby a two to one expansion of said video information is displayed by said display tube and the center of said expanded video information display is positioned in the center of said display tube.

7. A television scanning system comprising: a source of video information; a source of sync pulses; a display tube having an input, a horizontal deflection coil and a vertical deflection coil; means coupling said source of video information to said input of said display tube; horizontal deflection circuits for providing a first horizontal sweep waveform having a predetermined amplitude and a second horizontal sweep waveform which reaches said predetermined amplitude in one-half the time required for said first horizontal sweep waveform to reach that amplitude; vertical deflection circuits for providing a first vertical sweep waveform having a predetermined amplitude and a second vertical sweep waveform which reaches twice the amplitude of said first vertical sweep waveform in the same period of time; said horizontal and vertical deflection circuits coupled to said horizontal and vertical deflection coils, respectively, and normally coupled to said source of sync pulses; delay means connectable in the coupling between said source of sync pulses and said horizontal deflection circuit; and means operated to connect said delay means in said last mentioned coupling and for switching said horizontal and vertical deflection circuits to provide said second horizontal and vertical sweep waveforms, whereby a two to one expansion of said video information is displayed by said display tube and the center of said video information is positioned in the center of said display tube.

8. A television scanning system comprising: a source of video information; a source of sync pulses; a display tube having an input, a horizontal deflection coil and a vertical deflection coil; means coupling said source of video information to said input of said display tube; horizontal deflection circuits for providing a first horizontal sweep waveform having a predetermined amplitude and a second horizontal sweep waveform which reaches said predetermined amplitude in one-half the time required for said first horizontal sweep waveform to reach that amplitude; vertical deflection circuits for providing a first vertical sweep waveform having a predetermined amplitude and a second vertical sweep waveform which reaches twice the amplitude of said first vertical sweep waveform in the same period of time; said horizontal and vertical deflection circuits coupled to said horizontal and vertical deflection coils, respectively, and normally coupled to said source of sync pulses; first and second delay means connectable in said coupling between said source of sync pulses and said horizontal and vertical deflection circuits; first means operated to connect said first delay means in the coupling between said source of sync pulses and said horizontal deflection circuit and for switching said horizontal and vertical deflection circuits to provide said second horizontal and vertical sweep waveforms; and second means operated to connect said second delay means in the coupling between said source of sync pulses and said vertical deflection circuirt, whereby a two to one expansion of said video information is displayed by said display tube and the center of said video information is positioned on said display tube in accordance with the delay introduced by said first and second delay means.

9. A television scanning system comprising: a source of video information; a source of sync pulses; a display tube having an input, a horizontal deflection coil and a vertical deflection coil; means coupling said source of video information to said input of said display tube; horizontal deflection circuits for providing a first horizontal sweep waveform having a predetermined amplitude and a second horizontal sweep waveform which reaches said predetermined amplitude in one-half the time required for said first horizontal sweep waveform to reach that amplitude; vertical deflection circuits for providing a first vertical sweep waveform having a predetermined amplitude and a second vertical sweep waveform which reaches twice the amplitude of said first vertical sweep waveform in the same period of time; said horizontal and vertical deflection circuits coupled to said horizontal and vertical deflection coils, respectively, and normally coupled to said source of sync pulses; first delay means including a fixed delay and a variable delay connectable in the coupling between said source of sync pulses and said horizontal deflection circuit; first means operated to connect said first delayed means in said coupling between said source of sync pulses and said horizontal deflection circuit and for switching said horizontal and vertical deflection circuits to provide said second horizontal and vertical sweep waveforms, whereby a two to one expansion of said video information is displayed by said display tube and the center of said expanded video information is positioned in the center of said display tube; second delay means including a fixed delay and a variable delay connectable in the coupling between said source of sync pulses and said vertical deflection circuit; and second means operated to connect said second delay means in said coupling between said source of sync pulses and said vertical deflection circuit, whereby the center of said expanded video information may be positioned on said display tube anywhere within the periphery of the face of said display tube in accordance with the delay introduced by said first and second delay means.

10. A television scanning system comprising: a source of video information; a source of sync pulses; a display tube having an input, a horizontal deflection coil and a vertical deflection coil; means coupling said source of video information to said input of said display tube; horizontal deflection circuits for providing a first horizontal sweep waveform having a predetermined amplitude and a second horizontal sweep waveform which reaches said predetermined amplitude in one-half the time required for said first horizontal sweep waveform to reach that amplitude; vertical deflection circuits for providing a first vertical sweep waveform having a predetermined amplitude and a second vertical sweep waveform which reaches twice the amplitude of said first vertical sweep waveform in the same period of time; said horizontal and vertical deflection circuits coupled to said horizontal and vertical deflection coils, respectively; horizontal sync amplifier means coupled to said source of sync pulses and normally coupled to said horizontal deflection circuit; first delay means connectable in a first coupling between said horizontal sync amplifier means and said horizontal deflection circuit; vertical sync amplifier means coupled to said source of sync pulses and normally coupled to said vertical deflection circuit; second delay means connectable in a second coupling between said vertical sync amplifier means and said vertical deflection circuit; first means operated to connect said first delay means in said first coupling and for switching said horizontal and vertical deflection circuits to provide said second horizontal and vertical sweep waveforms, whereby a two to one expansion of said video information is displayed by said display tube and the center of said expanded video information is positioned in the center of said display tube; and second means operated to connect said second delay means in said second coupling, whereby the center of said expanded video information is positioned on said display tube in accordance with the delay introduced by said first and second delay means.

11. A television scanning system comprising: a source of video information; a source of sync pulses; a display tube having an input, a horizontal deflection coil, and a vertical deflection coil; means coupling said source of video information to said input of said display tube; horizontal deflection circuits providing a first horizontal sweep waveform having a predetermined amplitude and a second horizontal sweep waveform which reaches said predetermined amplitude in one-half the time required for said first horizontal sweep waveform to reach that amplitude; vertical deflection circuits providing a first vertical sweep waveform having a predetermined amplitude and a second vertical sweep waveform which reaches twice the amplitude of said first vertical sweep waveform in the same period of time; said horizontal and vertical deflection circuits being coupled to said horizontal and vertical deflection coils and normally coupled to said source of sync pulses: first delay means connectable in a first coupling between said source of sync pulses and said horizontal deflection circuit; second delay means connectable in a second coupling between said source of sync pulses and said vertical deflection circuit; relay means having a plurality of contacts for connecting said first and said second delay means in said first and said second coupling, respectively, for switching said horizontal and said vertical deflection circuits to provide said second horizontal and vertical sweep waveforms; and means rendering said relay means operative for operating said plurality of contacts, whereby the center of said expanded video information is positioned anywhere within the periphery of the face of said display tube in accordance with the delay introduced by said first and said second delay means.

References Cited by the Examiner
UNITED STATES PATENTS

| | | | |
|---|---|---|---|
| 2,310,671 | 2/43 | Batchelor | 178—7.5 |
| 2,480,068 | 8/49 | Wolff | 343—6 |
| 2,520,600 | 8/50 | Jones | 343—6 |
| 2,528,202 | 10/50 | Wolff | 343—6 |
| 2,534,610 | 12/50 | Marcy | 178—6.8 |
| 2,539,901 | 1/51 | Ewing | 343—6 |
| 2,720,645 | 10/55 | Sherwin | 343—10 |
| 2,754,508 | 7/56 | Ehrenfried | 343—11 |
| 2,775,757 | 12/56 | Ellsworth et al. | 343—11 |
| 2,930,844 | 3/60 | Donnay | 343—6 |
| 2,950,475 | 8/60 | Hance | 343—11 |
| 3,034,117 | 5/62 | Tower | 343—11 |

DAVID G. REDINBAUGH, *Primary Examiner.*

KATHLEEN H. CLAFFY, *Examiner.*